US008295016B2

(12) United States Patent
Elms

(10) Patent No.: US 8,295,016 B2
(45) Date of Patent: Oct. 23, 2012

(54) CIRCUIT INTERRUPTER AND RECEPTACLE INCLUDING IMPROVED CONTACT CONFIGURATION

(75) Inventor: Robert T. Elms, Monroeville, PA (US)

(73) Assignee: Eaton Corporation, Cleveland, OH (US)

( * ) Notice: Subject to any disclaimer, the term of this patent is extended or adjusted under 35 U.S.C. 154(b) by 481 days.

(21) Appl. No.: 12/569,216

(22) Filed: Sep. 29, 2009

(65) Prior Publication Data

US 2011/0075303 A1 Mar. 31, 2011

(51) Int. Cl.
*H02H 3/00* (2006.01)

(52) U.S. Cl. ........................................................ 361/42

(58) Field of Classification Search ..................... 361/42
See application file for complete search history.

(56) References Cited

U.S. PATENT DOCUMENTS

| | | | | |
|---|---|---|---|---|
| 5,184,269 | A * | 2/1993 | Shimada et al. | 361/24 |
| 6,958,895 | B1 * | 10/2005 | Radosavljevic et al. | 361/42 |
| 7,295,410 | B1 | 11/2007 | Packard et al. | |
| 7,463,124 | B2 | 12/2008 | DiSalvo et al. | |
| 7,498,909 | B2 | 3/2009 | Zhang et al. | |
| 7,518,840 | B2 | 4/2009 | Elms | |
| 7,538,994 | B2 | 5/2009 | Bonilla et al. | |
| 2008/0020627 | A1 * | 1/2008 | Sexton et al. | 439/404 |

OTHER PUBLICATIONS

"GFCIs Specification Grade Dead Front 20A, 125VAC—SF1103R3." Legrand Pass & Seymour, Mar. 2006.*

* cited by examiner

*Primary Examiner* — Rexford Barnie
*Assistant Examiner* — Scott Bauer
(74) *Attorney, Agent, or Firm* — Eckert Seamans Cherin & Mellott, LLC; Kirk D. Houser

(57) ABSTRACT

A circuit interrupter includes first, second and third electrical conductors, a planar conductive member having first, second and third contacts, and an operating mechanism structured to move the planar conductive member toward the electrical conductors to electrically connect the first, second and third electrical conductors to the respective first, second and third contacts, and to move the planar conductive member away from the electrical conductors to electrically disconnect the electrical conductors from the contacts upon the occurrence of a predetermined condition, such that the electrical conductors are electrically isolated from each other. When one of the electrical conductors is welded to one of the contacts, the operating mechanism and the planar conductive member cooperate to electrically disconnect the other two of the electrical conductors from the other two of the contacts upon the occurrence of the predetermined condition.

16 Claims, 14 Drawing Sheets

CIRCUIT INTERRUPTER AND RECEPTACLE INCLUDING IMPROVED CONTACT CONFIGURATION

BACKGROUND

1. Field

The disclosed concept pertains generally to electrical switching apparatus and, more particularly, to circuit interrupters. The disclosed concept also pertains to receptacles.

2. Background Information

Known ground fault circuit interrupter (GFCI) and/or arc fault circuit interrupter (AFCI) receptacles include, for example, reverse feed and swapped wiring protection. However, if a single contact welds in the line path, then all of this protection is lost.

As shown in FIG. 1, some receptacles include three different electrical conductors 2,4,6. The first electrical conductor 2 includes a bendable/flexible contact arm 8 having a pair of contacts 10,12 capable of electrically connecting with the other two electrical conductors 4,6. This pair of contacts 10,12 makes and breaks electrical contact with two other contact arms 14,16, each having a single contact 18,20 to mate with one of the pair of contacts 10,12, respectively, of the bendable/flexible contact arm 8. The first electrical conductor 2 electrically connects to an electrical source (e.g., line) (not shown), the second electrical conductor 4 electrically connects to a load (e.g., a downstream receptacle) (not shown), and the third electrical conductor 6 electrically connects to an electrical connection (not shown) for attachment to a user load (e.g., one or two three-terminal female outlets (e.g., ports) on the face of the receptacle) (not shown). The pairs of contacts 10,18 and 12,20 can be opened and closed by conventional reset and test buttons (not shown) or by a trip mechanism (not shown) as are well known in the art. If any one contact pair of the two contact pairs 10,18 and 12,20 fails to open (e.g., welds), then two of the three electrical conductors 2,4,6 remain electrically connected together even in the tripped or open state of the receptacle. Hence, this presents a safety hazard upon the failure of one of the two contact pairs 10,18 and 12,20. For example, if such receptacle trips with a set of welded line contacts, then the line voltage is still present at the load terminals. Furthermore, if the line and load terminals (not shown) are electrically connected in error, then reverse feed detection does not function. Also, if such receptacle trips on a swapped line and neutral with a set of welded neutral contacts (not shown), then the line voltage is still present at the load terminals (not shown).

There is room for improvement in circuit interrupters.

There is also room for improvement in receptacles.

SUMMARY

These needs and others are met by embodiments of the disclosed concept, which provide a contact configuration for a circuit interrupter or receptacle that maintains protection even if one contact pair fails to open (e.g., welds). This also provides a relatively simple and low cost approach.

In accordance with one aspect of the disclosed concept, a circuit interrupter comprises: a first electrical conductor; a second electrical conductor; a third electrical conductor; a planar conductive member comprising: a first contact, a second contact, and a third contact; and an operating mechanism structured to move the planar conductive member toward the electrical conductors to electrically connect the first electrical conductor, the second electrical conductor and the third electrical conductor to the first contact, the second contact and the third contact, respectively, and to move the planar conductive member away from the electrical conductors to electrically disconnect the first electrical conductor, the second electrical conductor and the third electrical conductor from the first contact, the second contact and the third contact, respectively, upon the occurrence of a predetermined condition, such that the electrical conductors are electrically isolated from each other, wherein when one of the first electrical conductor, the second electrical conductor and the third electrical conductor is welded to one of the first contact, the second contact and the third contact, respectively, the operating mechanism and the planar conductive member cooperate to electrically disconnect the other two of the first electrical conductor, the second electrical conductor and the third electrical conductor from the other two of the first contact, the second contact and the third contact, respectively, upon the occurrence of the predetermined condition.

The operating mechanism may comprise a longitudinal member; and the planar conductive member may be normally disposed normal to the longitudinal member.

The longitudinal member may engage the planar conductive member at a position equidistant from each of the contacts.

The planar conductive member may be structured to tilt with respect to the longitudinal member and the electrical conductors.

The operating mechanism may comprise a carriage member and a reset member coupled to the carriage member; and the planar conductive member may be pivotally coupled to the carriage member, in order that when the one of the first contact, the second contact and the third contact is welded to the one of the first electrical conductor, the second electrical conductor and the third electrical conductor, respectively, the planar conductive member is structured to tilt to electrically disconnect the other two of the first electrical conductor, the second electrical conductor and the third electrical conductor from the other two of the first contact, the second contact and the third contact, respectively, upon the occurrence of the predetermined condition.

The carriage member may include a spring member having a plurality of arms structured to bias the other two of the first contact, the second contact and the third contact away from the other two of the first electrical conductor, the second electrical conductor and the third electrical conductor, respectively, upon the occurrence of the predetermined condition.

As another aspect of the disclosed concept, a circuit interrupter comprises: a first electrical conductor comprising a first contact; a second electrical conductor comprising a second contact; a third electrical conductor comprising a third contact; a conductive member comprising: a fourth contact, a fifth contact, and a sixth contact; and an operating mechanism structured to move the conductive member toward the electrical conductors to electrically connect the first contact, the second contact and the third contact to the fourth contact, the fifth contact and the sixth contact, respectively, and to move the conductive member away from the electrical conductors to electrically disconnect the first contact, the second contact and the third contact from the fourth contact, the fifth contact and the sixth contact, respectively, upon the occurrence of a predetermined condition, such that the electrical conductors are electrically isolated from each other, wherein the fourth contact, the fifth contact and the sixth contact are biased toward the first contact, the second contact and the third contact, respectively, or the first contact, the second contact and the third contact are biased toward the fourth contact, the fifth contact and the sixth contact, respectively, and wherein the first contact, the second contact and the third contact are at least one of co-linear or co-planar.

As another aspect of the disclosed concept, a circuit interrupter comprises: for each of a line input and a neutral input: a first electrical conductor; a second electrical conductor; a third electrical conductor; a planar conductive member comprising: a first contact, a second contact, and a third contact; and an operating mechanism structured to move the planar conductive member toward the electrical conductors to electrically connect the first electrical conductor, the second electrical conductor and the third electrical conductor to the first contact, the second contact and the third contact, respectively, and to move the planar conductive member away from the electrical conductors to electrically disconnect the first electrical conductor, the second electrical conductor and the third electrical conductor from the first contact, the second contact and the third contact, respectively, upon the occurrence of a predetermined condition, such that the electrical conductors are electrically isolated from each other, wherein when one of the first electrical conductor, the second electrical conductor and the third electrical conductor is welded to one of the first contact, the second contact and the third contact, respectively, the operating mechanism and the planar conductive member cooperate to electrically disconnect the other two of the first electrical conductor, the second electrical conductor and the third electrical conductor from the other two of the first contact, the second contact and the third contact, respectively, upon the occurrence of the predetermined condition.

The planar conductive member may be structured to tilt with respect to the longitudinal member and the electrical conductors.

The longitudinal member may engage the planar conductive member at a position equidistant from each of the contacts.

As another aspect of the disclosed concept, a receptacle comprises: a first electrical conductor; a second electrical conductor; a conductive member comprising: a first contact, and a second contact; and an operating mechanism structured to move the conductive member toward the electrical conductors to electrically connect the first electrical conductor and the second electrical conductor to the first contact and the second contact, respectively, and to move the conductive member away from the electrical conductors to electrically disconnect the first electrical conductor and the second electrical conductor from the first contact and the second contact, respectively, upon the occurrence of a predetermined condition, such that the electrical conductors are electrically isolated from each other, wherein when one of the first electrical conductor and the second electrical conductor is welded to one of the first contact and the second contact, respectively, the operating mechanism and the conductive member cooperate to electrically disconnect the other one of the first electrical conductor and the second electrical conductor from the other one of the first contact and the second contact, respectively, upon the occurrence of the predetermined condition, and wherein the first contact and the second contact are co-linear.

The receptacle may be a faceless receptacle; the first electrical conductor may be a line conductor; and the second electrical conductor may be structured to be electrically connected to a downstream load.

The receptacle may be a receptacle including a face; the first electrical conductor may be a line conductor; and the second electrical conductor may be structured to be electrically connected to a user load through the face.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the term "processor" means a programmable analog and/or digital device that can store, retrieve, and process data; a computer; a workstation; a personal computer; a microprocessor; a microcontroller; a microcomputer; a central processing unit; a mainframe computer; a mini-computer; a server; a networked processor; or any suitable processing device or apparatus.

The disclosed concept is described in association with receptacles, although the disclosed concept is applicable to a wide range of circuit interrupters.

Figure 1:
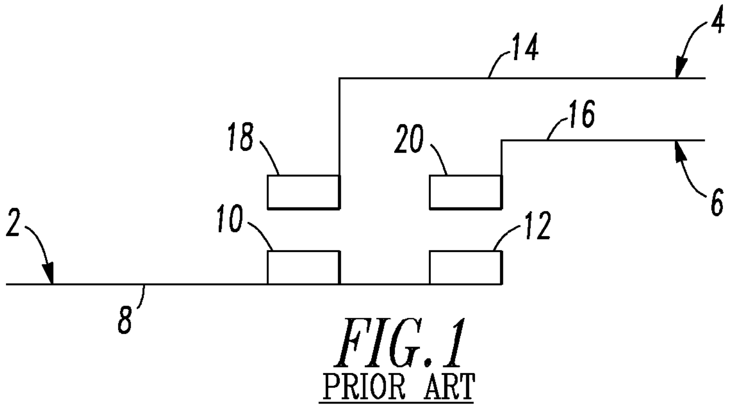
FIG. 1 PRIOR ART
FIG. 1 is a block diagram in schematic form of fixed and movable contacts of a receptacle.
Figure 2:
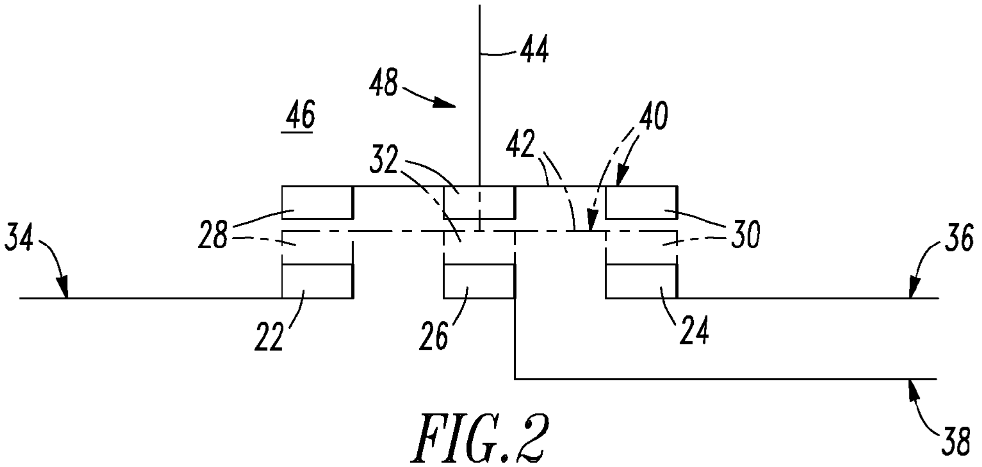
FIG. 2 is a block diagram in schematic form of fixed and movable contacts in accordance with embodiments of the disclosed concept.
Figure 3:
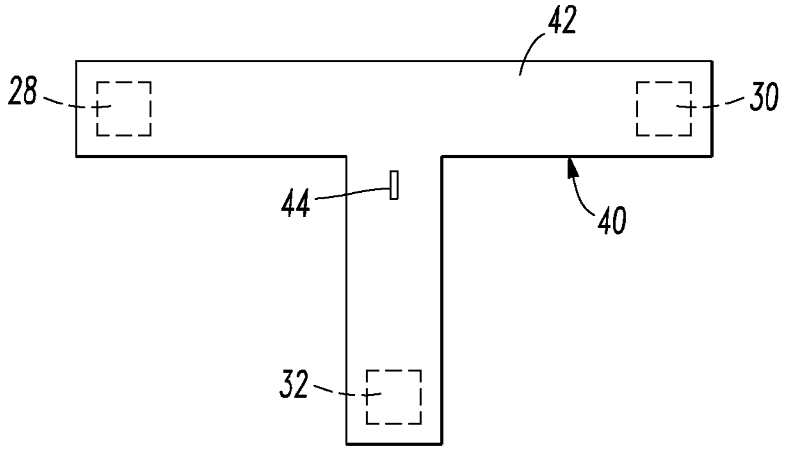
FIG. 3 is a plan view of the movable contacts of FIG. 2.

FIG. 2 shows an improved contact configuration including three example fixed contacts 22,24,26 and three example movable contacts 28,30,32. In this configuration, there are four example electrical conductors 34,36,38,40, none of which need be bendable and/or flexible. The first electrical conductor 34 electrically connects to a electrical source (e.g., line) (not shown), the second electrical conductor 36 electrically connects to a load (e.g., a downstream receptacle) (not shown), and the third electrical conductor 38 electrically connects to an electrical connection for attachment to a user load (e.g., one or two three-terminal female outlets (e.g., ports) on the face of the receptacle) (not shown in FIG. 2). Each of the three electrical conductors 34,36,38 includes a single fixed contact 22,24,26, respectively. None of these three electrical conductors 34,36,38 electrically connect to each other in the open position, as shown. The fourth electrical conductor 40 is movable (e.g., upward and downward with respect to FIG. 2) and includes the three contacts 28,30,32 as shown in FIGS. 2 and 3. The fourth electrical conductor 40 makes and breaks electrical connection with the other three electrical conductors 34,36,38, in order to either electrically connect all the other three electrical conductors 34,36,38 together (as shown in phantom line drawing in FIG. 2) or to electrically disconnect all the other three electrical conductors 34,36,38 from each other, as shown in FIG. 2.

This contact configuration includes three example contact pairs 22,28, 24,30 and 26,32. As will be described, if any one of these contact pairs 22,28, 24,30 and 26,32 fails to open (e.g., welds), then all of the first three electrical conductors 34,36,38 are electrically disconnected from each other in the tripped or open states. This provides a fail-safe approach for a first contact failure. This fail-safe feature (i.e., the three electrical conductors 34,36,38 are not electrically connected when one contact pair welds) enables more reliable miswiring (e.g., swapped line and neutral; reverse feed) and trip protection. For example, if there is a single contact pair welding when the line and neutral (not shown) conductors are swapped, then the disclosed contact configuration is of benefit. In contrast, in known prior receptacles, if a contact in series with a line conductor fails to open due to contact welding, then all wiring and loads, at either the receptacle face or downstream wiring, will be at line potential. The disclosed fail-safe feature guarantees that a single contact pair failure cannot result in an unsafe condition. For example, during self test, if there is a welded contact pair and, thus, a contact failure, then the three example contact pairs 22,28, 24,30 and 26,32 fail safe.

As shown in FIG. 3, the example fourth electrical conductor 40 can be an example three-contact buss bar (CBB) 42. The CBB 42 does not rotate and is moved towards and away from the fixed contacts 22,24,26 (FIG. 2) by an example rod 44 centrally positioned between all three contacts 28,30,32, such that the rod 44 engages the CBB 42 at a position equidistant from each of the contacts 28,30,32. For example, the CBB 42 does not slide on the rod 44, but it can tilt on the rod 44. As will be described, if any one of the contact pairs 22,28, 24,30 and 26,32 weld and the rod 44 attempts to open the contact pairs, then the CBB 42 tilts such that the non-welded contact pairs separate even though the welded contact pair does not break electrical contact. This ensures that the three electrical conductors 34,36,38 are open, as intended, even with a welded contact. Furthermore, some bending at the weld point can occur and this can ultimately break the weld with multiple open/close attempts.

Referring again to FIG. 2, a circuit interrupter 46 includes the electrical conductors 34,36,38, a planar conductive member, such as the example CBB 42 of FIG. 3, which includes the contacts 28,30,32, and an operating mechanism 48, which includes the example rod 44. The operating mechanism 48 is structured to move the planar conductive member or CBB 42 toward the electrical conductors 34,36,38 to electrically connect (as shown in phantom line drawing in FIG. 2) the electrical conductors 34,36,38 (e.g., the contacts 22,24,26 thereof) to the respective contacts 28,30,32, and to move the planar conductive member or CBB 42 away from the electrical conductors 34,36,38 to electrically disconnect (as shown in FIG. 2) the electrical conductors 34,36,38 from the respective contacts 28,30,32 upon the occurrence of a predetermined condition (e.g., as detected by a trip mechanism (not shown) of the operating mechanism 48), such that the electrical conductors 34,36,38 are electrically isolated from each other. When one of the electrical conductors 34,36,38 is welded to one of the respective contacts 28,30,32, the operating mechanism 48 (e.g., the rod 44) and the planar conductive member or CBB 42 cooperate to electrically disconnect the other two of the electrical conductors 34,36,38 from the other two of the respective contacts 28,30,32, upon the occurrence of the predetermined condition (e.g., without limitation, an over current condition).

Figure 4:
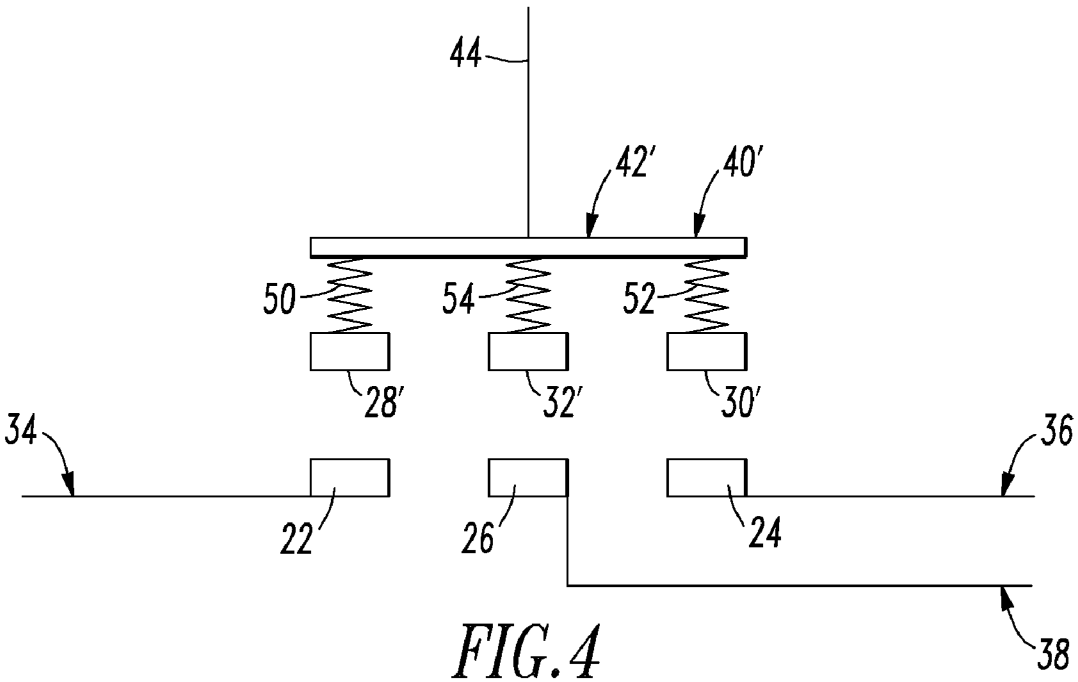
FIG. 4 is a block diagram in schematic form of fixed and movable contacts in accordance with another embodiment of the disclosed concept.

FIG. 4 shows another example contact configuration in which a fourth electrical conductor 40' can be an example three-contact buss bar (CBB) 42', in which three contacts 28',30',32' can be co-linear or co-planar. Here, the example CBB 42' need not pivot with respect to the example rod 44. Instead, each of the contacts 28',30',32' is biased toward the fixed contacts 22,24,26 by electrically conductive spring members 50,52,54, respectively.

Figure 5:
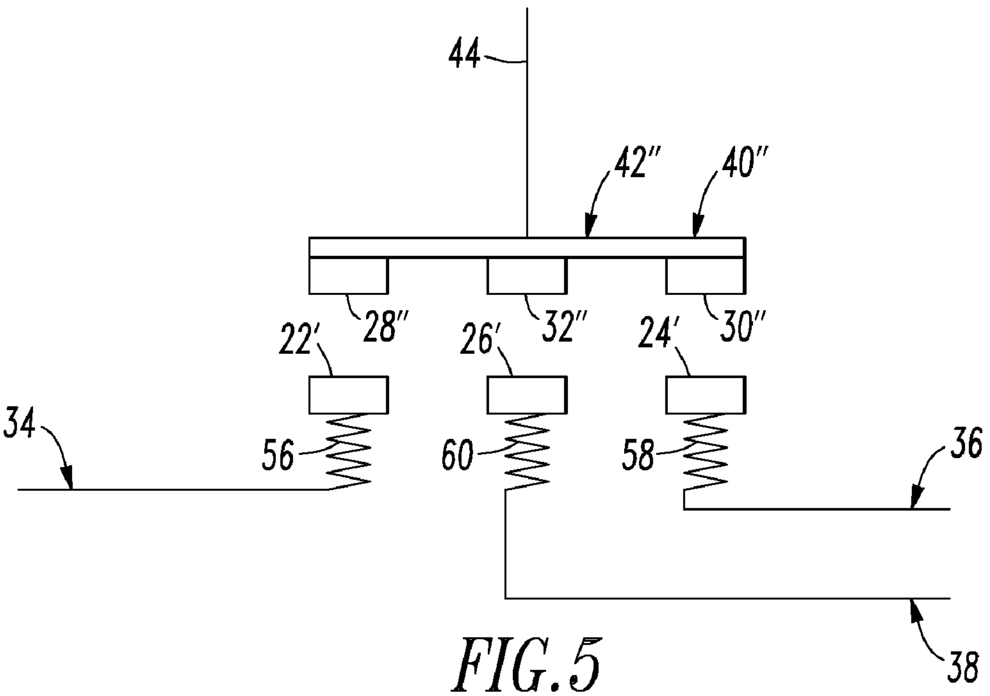
FIG. 5 is a block diagram in schematic form of fixed and movable contacts in accordance with another embodiment of the disclosed concept.

FIG. 5 shows another example contact configuration in which a fourth electrical conductor 40" can be an example three-contact buss bar (CBB) 42", where the three contacts 28",30",32" can be co-linear or co-planar. Here, the example CBB 42" need not pivot with respect to the example rod 44. Instead, each of the contacts 22',24',26' is biased toward the contacts 28",30",32" by electrically conductive spring members 56,58,60, respectively.

Figure 6:
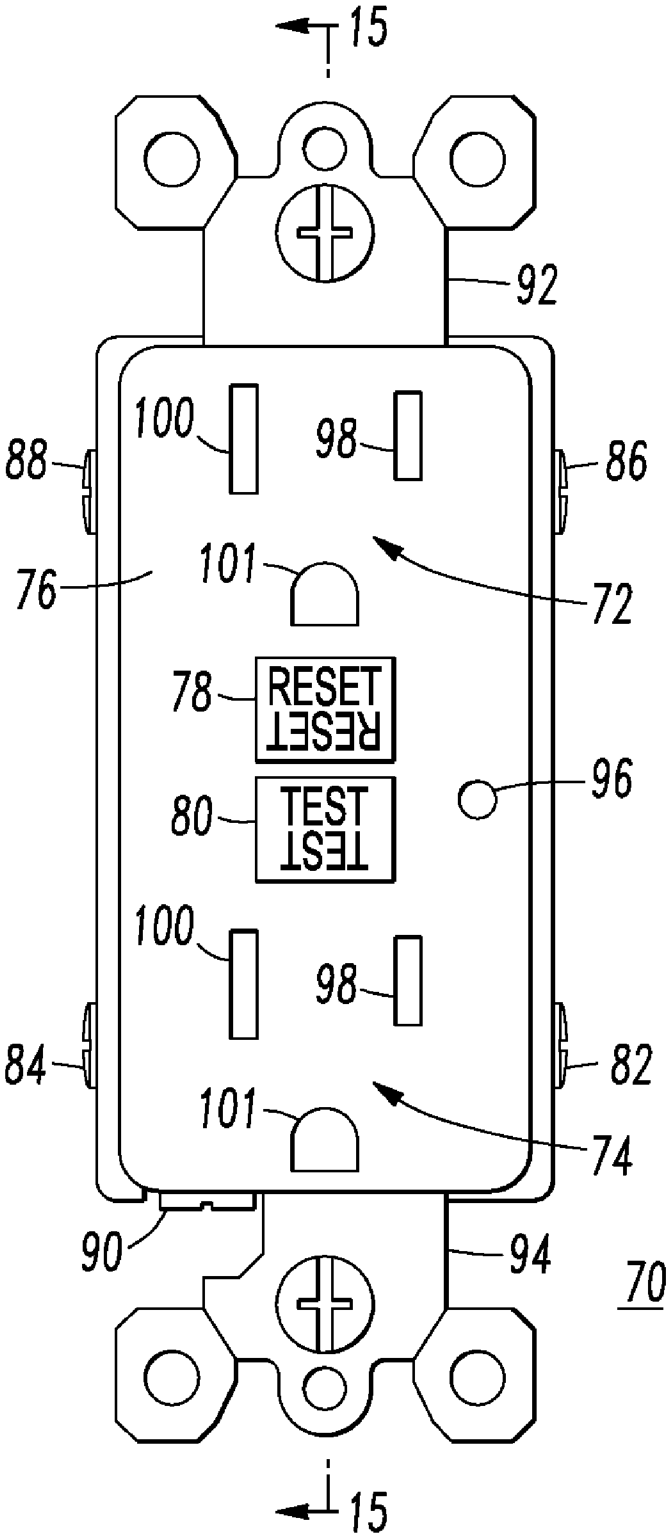
FIG. 6 is a plan view of a receptacle in accordance with other embodiments of the disclosed concept.

FIG. 6 shows a circuit interrupter, such as an example receptacle 70. The receptacle 70 includes conventional features such as two female outlets (e.g., ports) 72,74 on a receptacle face 76, a reset button 78, a test button 80, a line terminal 82, a neutral terminal 84, a load line terminal 86, a load neutral terminal 88, a ground terminal 90 and two mounting ears 92,94. The example receptacle 70 further includes an indicator 96. As is conventional, each of the two female outlets 72,74 includes a line 98, a neutral 100 and a ground 101.

Figure 7:
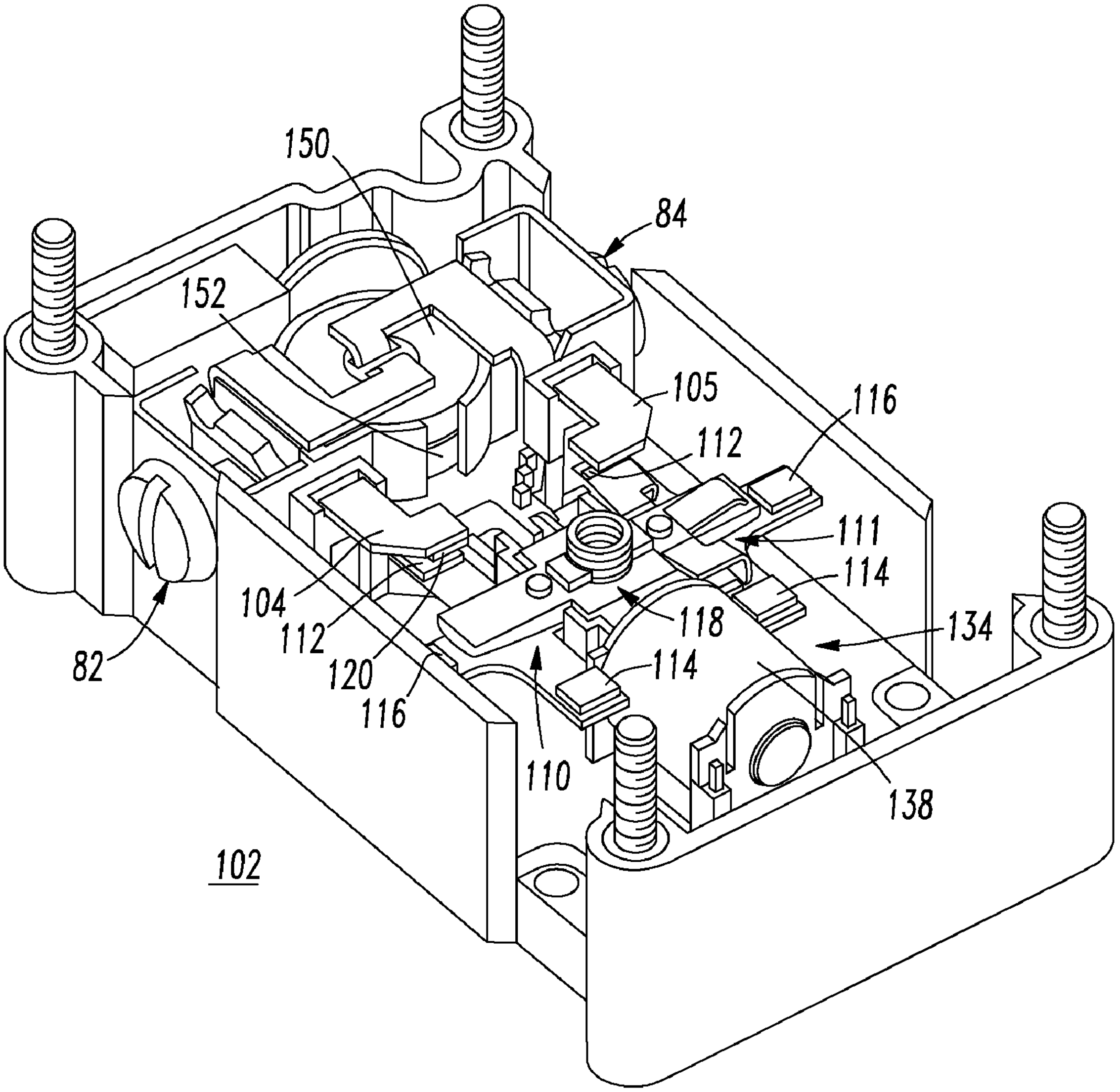
FIG. 7 is an isometric view of a base portion of the receptacle of FIG. 6.
Figure 8:
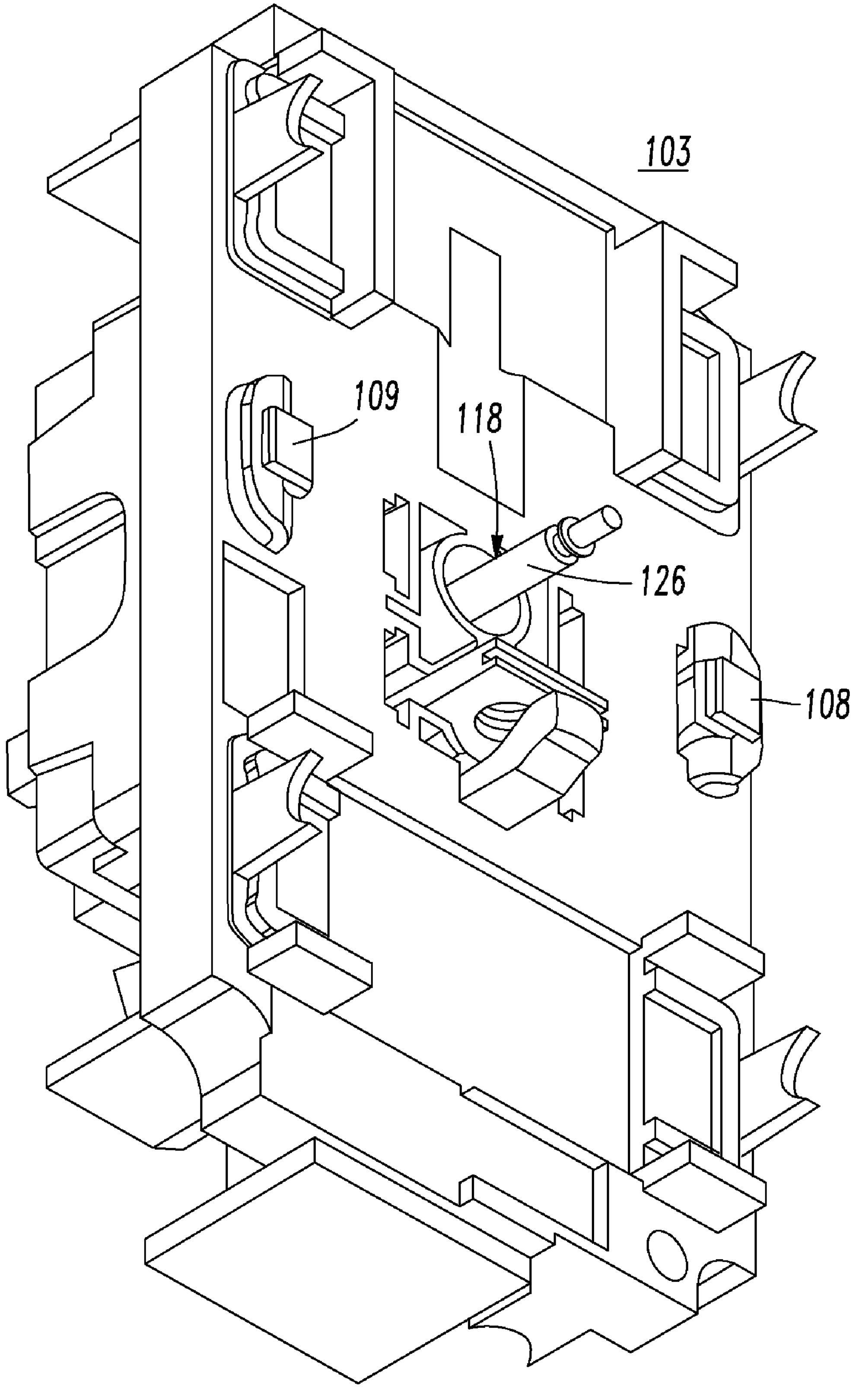
FIG. 8 is an isometric view of a cover portion of the receptacle of FIG. 6.
Figure 9:
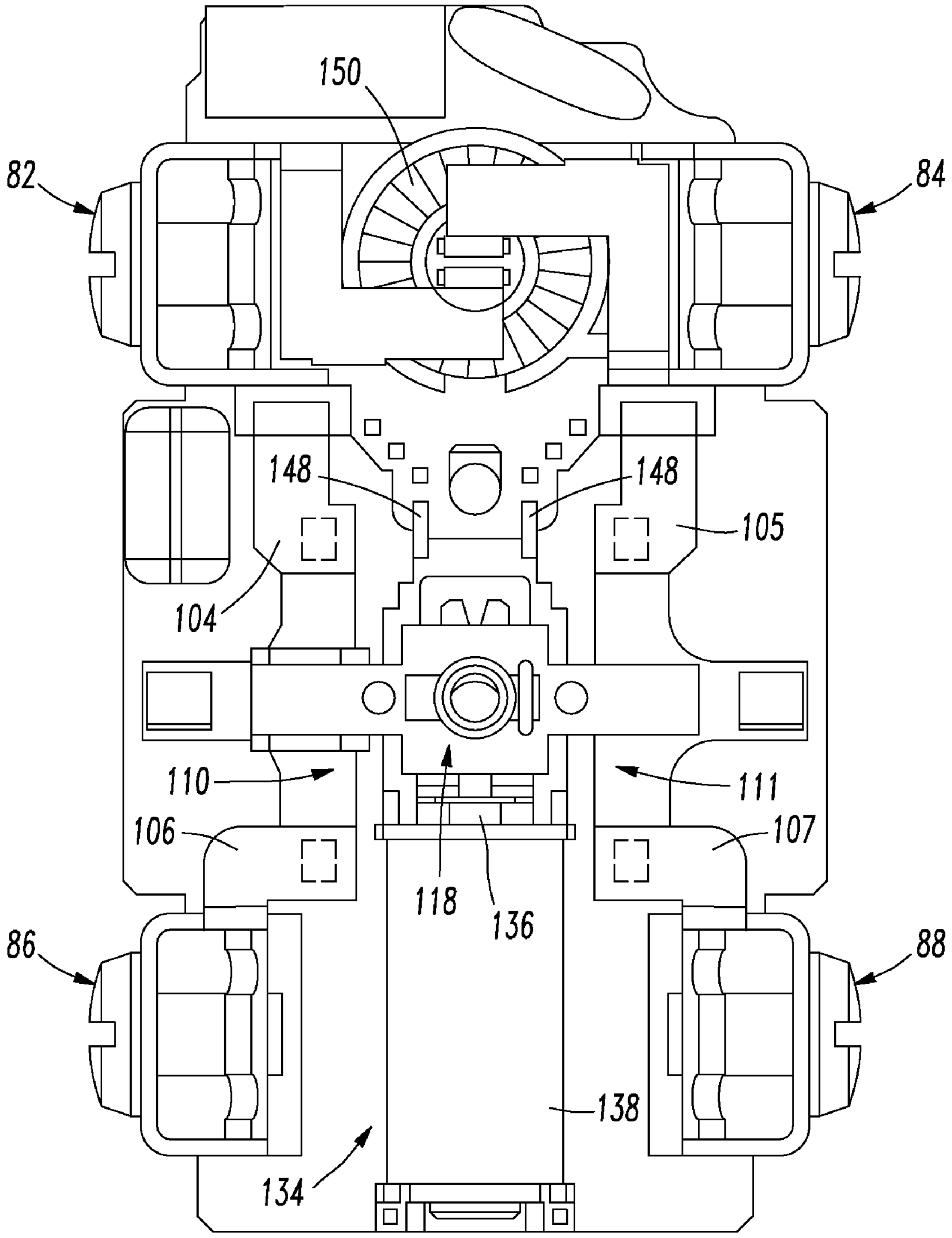
FIG. 9 is a plan view of the base portion of the receptacle of FIG. 7.
Figure 11:
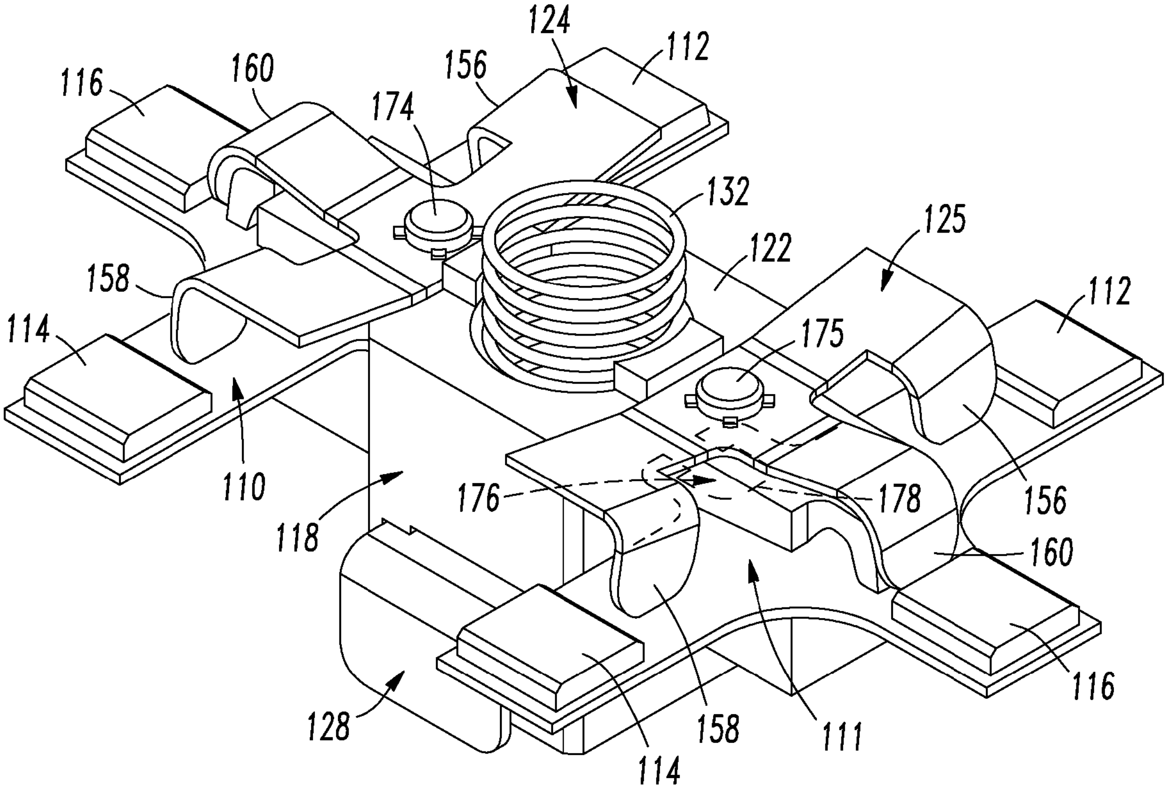
FIG. 11 is an isometric view of a carriage and the movable contact assemblies of the receptacle of FIG. 7.

Referring to FIGS. 7-9, a base portion 102 and a cover portion 103 of the example receptacle 70 of FIG. 6 are shown. For simplicity of reference, the load line terminal 86 and the load neutral terminal 88 are not shown in FIG. 7. The example receptacle 70 of FIG. 6 includes, for each of the line input from line terminal 82 and the neutral input from neutral terminal 84, a first electrical conductor 104,105 (e.g., line; neutral), a second electrical conductor 106,107 (e.g., load; load neutral) (shown in FIG. 9), a third electrical conductor 108,109 (shown in FIG. 8) (e.g., user load 98; user load neutral 100 (FIG. 6)), and an example planar conductive member (CBB) 110,111. Each of the example CBBs 110,111 (as best shown in FIG. 11) includes a first contact 112, a second contact 114, and a third contact 116. The neutral input from the neutral terminal 84 is switched by the second CBB 111. The neutral contact configuration can essentially be identical to or a mirror image of the line contact configuration switched by the first CBB 110. For example, this enables reverse feed protection when tripped.

Figure 12:
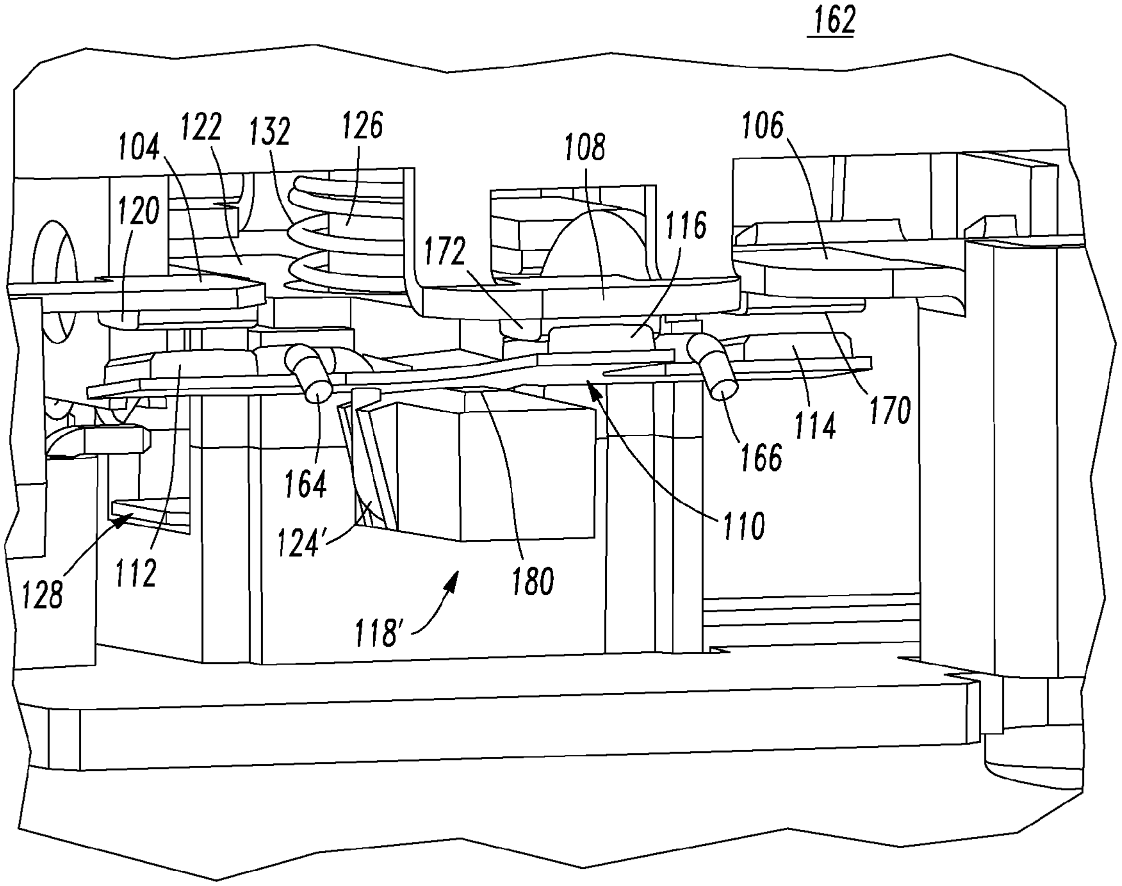
FIGS. 12-14 are isometric views of fixed and movable contacts in the open position showing a load contact welded, a line or feed contact welded, and a normal open position, respectively, in accordance with other embodiments of the disclosed concept.
Figure 13:
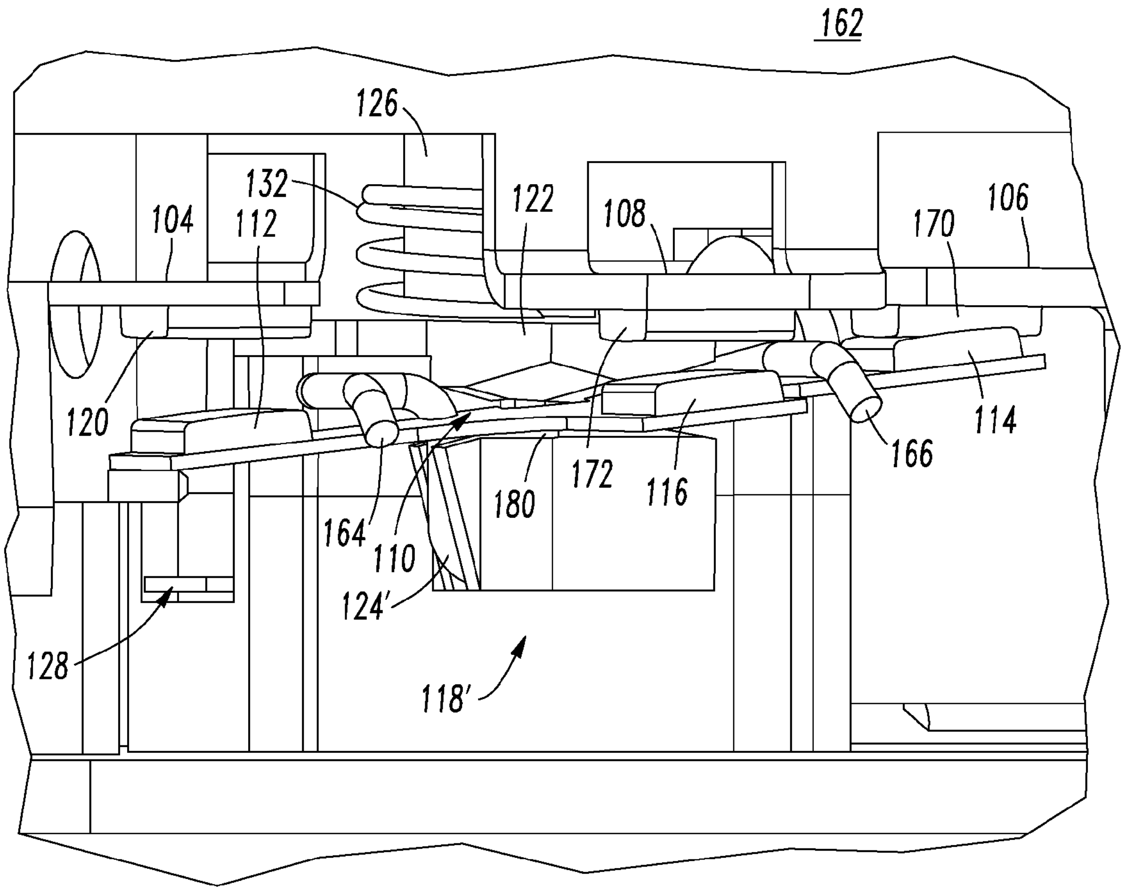
Figure 14:
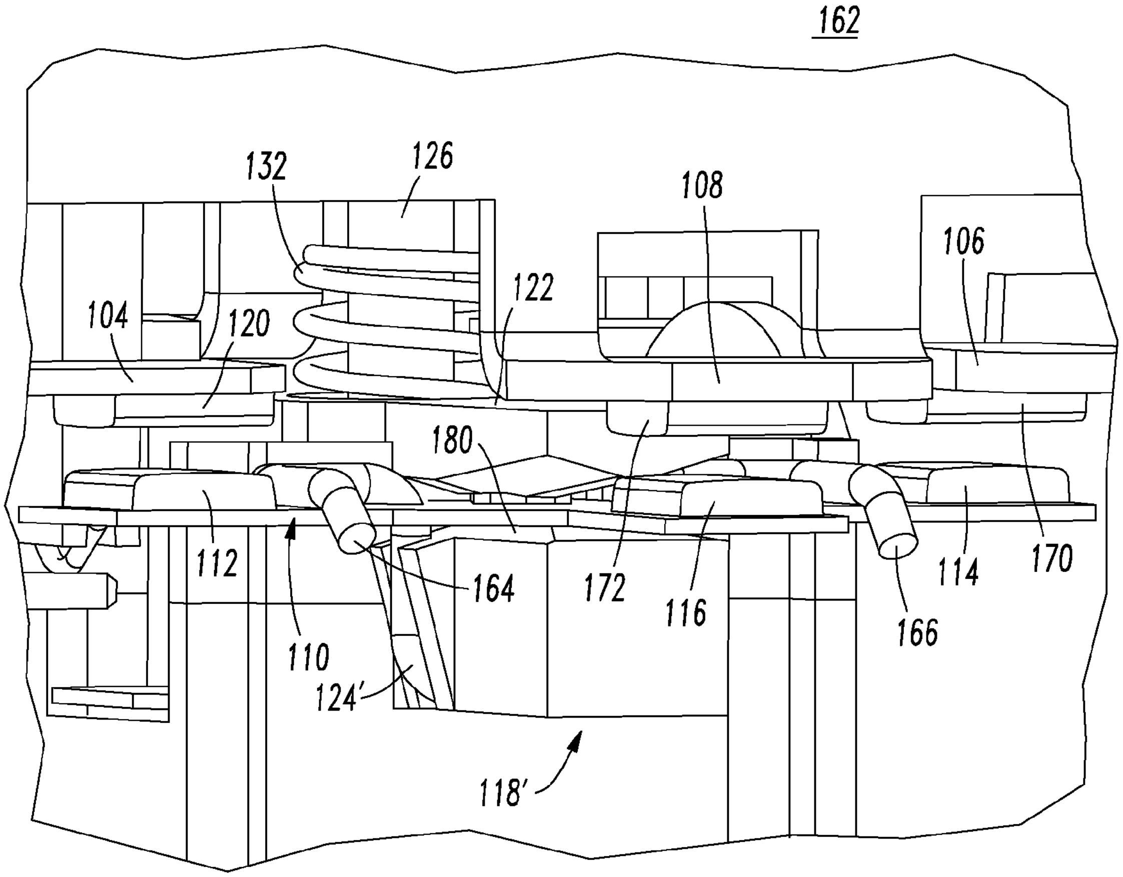

An operating mechanism 118 is structured to move the CBBs 110,111 toward (e.g., without limitation, upward with respect to FIGS. 7, 8 and 11) the electrical conductors 104, 105,106,107,108,109 and the contacts thereof (generally not shown, but see the contact 120 of the electrical conductor 104 in FIG. 7, and the contacts 120,170,172 of FIGS. 12-14) to electrically connect the first electrical conductors 104,105, the second electrical conductors 106,107 and the third electrical conductors 108,109 to the first contacts 112, the second contacts 114 and the third contacts 116, respectively, and to move the CBBs 110,111 away from (e.g., without limitation, downward with respect to FIGS. 7, 8 and 11) the electrical conductors 104,105,106,107,108,109 and the contacts thereof to electrically disconnect the first electrical conductors 104,105, the second electrical conductors 106,107 and the third electrical conductors 108,109 from the first contacts 112, the second contacts 114 and the third contacts 116, respectively, upon the occurrence of a predetermined condition, such that the electrical conductors 104,105,106,107, 108,109 are electrically isolated from each other.

Figure 16:
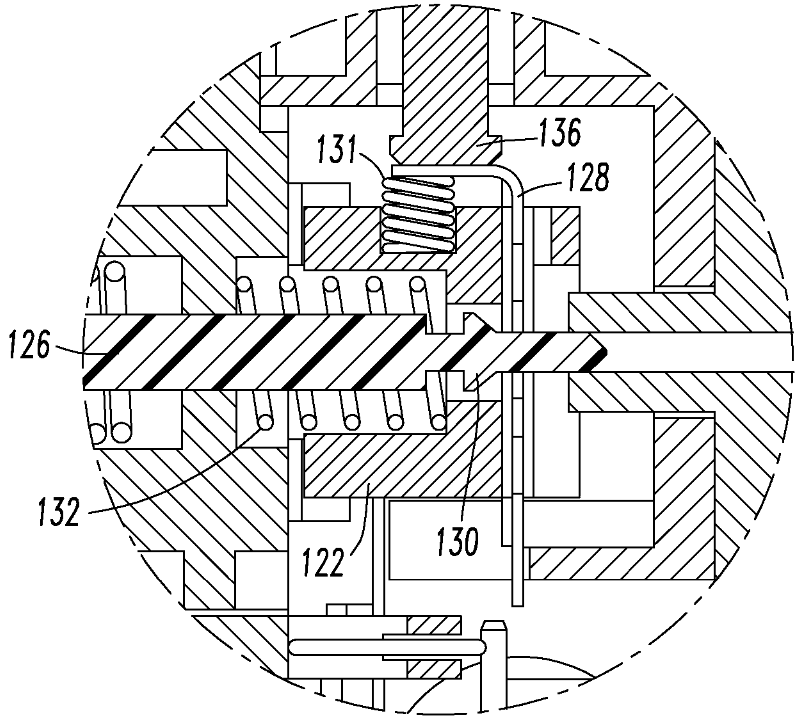
FIG. 16 is a more detailed view of a portion of FIG. 15 as shown in a tripped position.

Referring to FIG. 11, the operating mechanism 118 includes a carriage, such as the example plastic shutter block 122, and spring members 124,125 for the respective CBBs 110,111. The operating mechanism 118 also includes a longitudinal member, such as the example rod 126 (FIG. 8) of the reset pushbutton 78 (FIG. 6). The rod 126 engages a trip shutter 128 in an armed or closed position shown in FIG. 17, and releases the trip shutter 128 in a tripped or open position shown in FIG. 16. When armed or closed, a latch portion 130 of the rod 126 engages an edge of an oblong aperture (not shown) of the trip shutter 128 and holds the plastic shutter block 122 and the CBBs 110,111 upward with respect to FIG. 11 against the bias of main spring 132. The trip shutter 128 is normally biased upward (with respect to FIG. 17) by spring 131. The CBBs 110,111 are normally disposed normal to the rod 126. Preferably, the CBBs 110,111 are electrically isolated from the rod 126 by the plastic shutter block 122.

Figure 10:
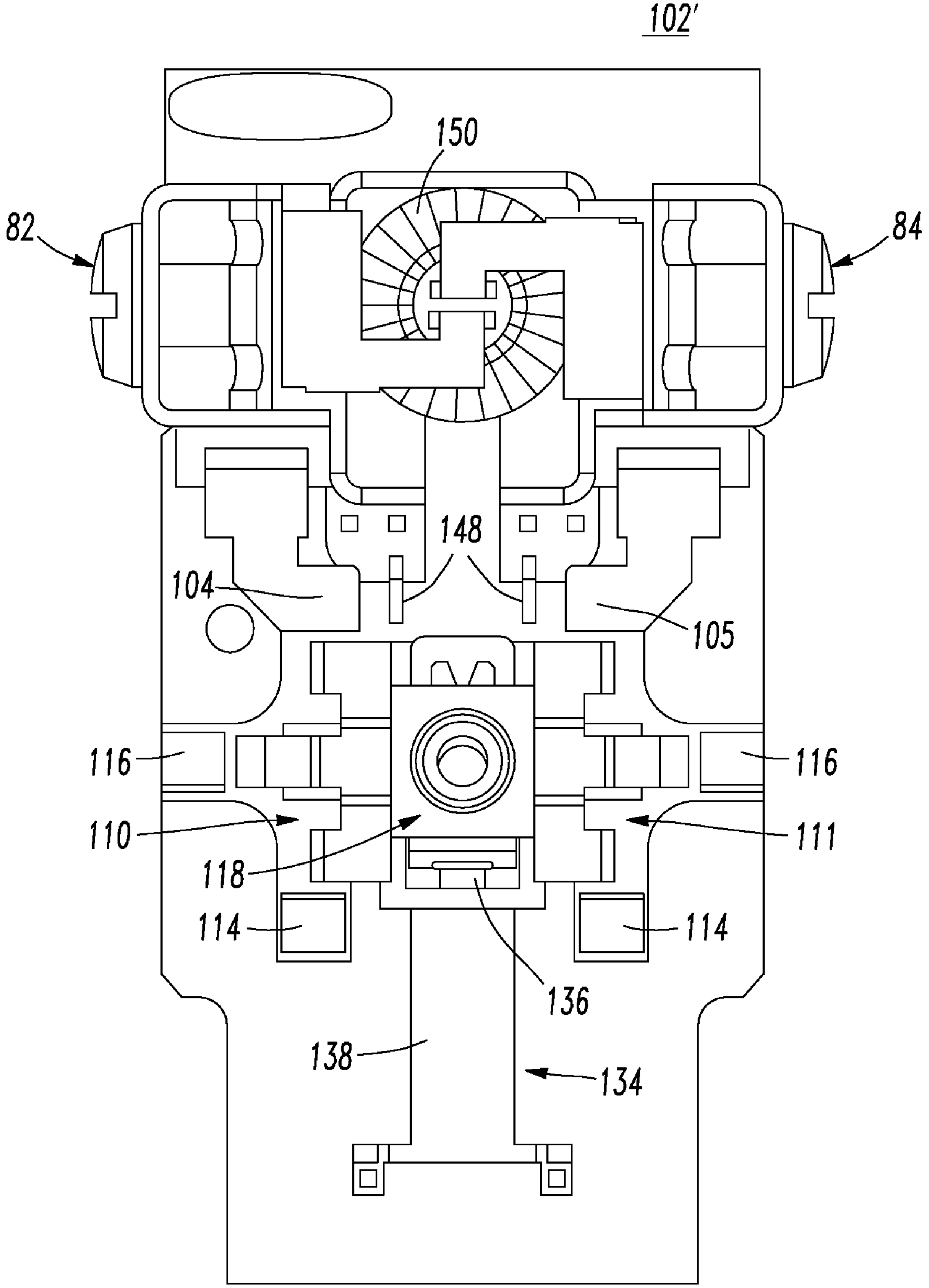
FIG. 10 is a plan view of a base portion of a receptacle in accordance with another embodiment of the disclosed concept.
Figure 15:
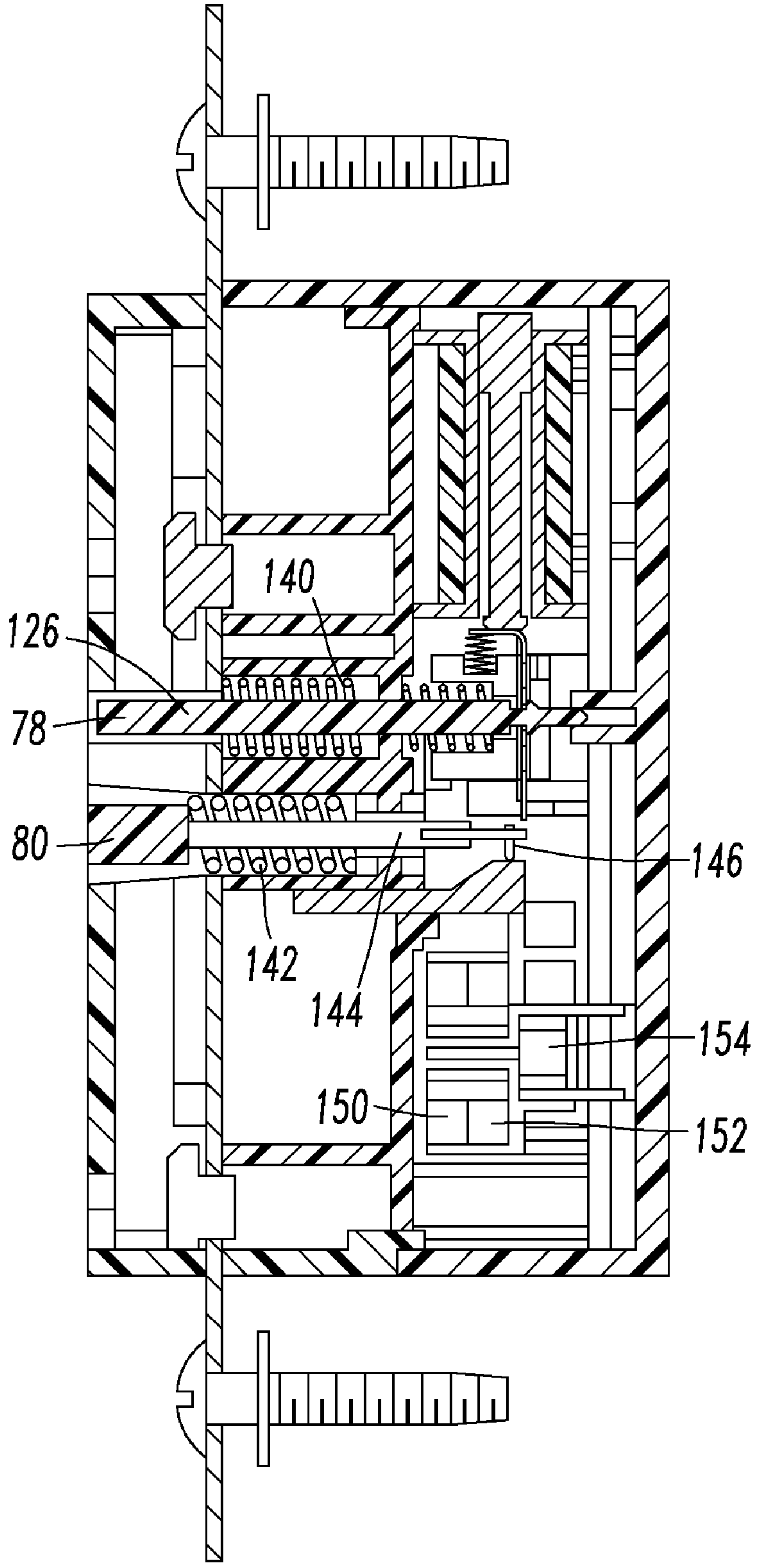
FIG. 15 is a cross sectional view along lines 15-15 of FIG. 6.

The operating mechanism 118 also includes a trip mechanism 134 (FIGS. 7, 9 and 10). Upon the occurrence of a predetermined condition, which is detected by the trip mechanism 134, a solenoid 138 (FIGS. 7, 9 and 10) is energized by the trip mechanism 134 and causes a solenoid plunger 136 to move downward with respect to FIG. 16. This causes the trip shutter 128 to move downward (with respect to FIG. 17) to the position shown in FIG. 17. As a result, the latch portion 130 of the rod 126 releases the edge of the oblong aperture (not shown) of the trip shutter 128. Then, the plastic shutter block 122 and, thus, the trip shutter 128 and the CBBs 110,111 are driven right (with respect to FIG. 16) by the bias of the main spring 132. Hence, the plastic shutter block 122 and the CBBs 110,111 move downward with respect to FIG. 11. This causes the electrical disconnection of the electrical conductors 104, 105, 106,107 and 108,109 from the contacts 112, 114 and 116, respectively, upon the occurrence of the predetermined condition, such that the electrical conductors 104,105,106, 107,108,109 (FIGS. 7-9) are electrically isolated from each other. Hence, in the open or tripped state, the contacts 112, 114,116 are electrically isolated from all of the other electrical conductors 104,105,106,107,108,109. From the tripped or open position of FIG. 16, by depressing the reset pushbutton 78 of FIGS. 6 and 15, the rod 126 and the latch portion 130 thereof are driven downward with respect to FIG. 11 and to the right with respect FIG. 16. Then, the latch portion 130 engages the edge of the oblong aperture (not shown) of the trip shutter 128 and moves it upward with respect to FIG. 16. After the trip shutter 128 is re-latched and after the reset pushbutton 78 is released, a spring 140 biases the reset pushbutton 78 (e.g., left with respect to FIG. 15). This overcomes the bias of the main spring 132 and moves the trip shutter 128 upward with respect to FIG. 17. This causes the plastic shutter block 122 and the CBBs 110,111 to move upward with respect to FIG. 11, which causes the contacts 112, 114 and 116 to be electrically connected to the other electrical conductors 104,105, 106,107 and 108,109.

The rod 126 and the trip shutter 128 function as a latching mechanism, and the trip solenoid 138 functions as an unlatching mechanism. The reset pushbutton 78 is structured to reset the latching mechanism, and the trip pushbutton 80 is structured to activate the unlatching mechanism. The trip push button 80 of FIGS. 6 and 15 can be depressed (to the right with respect to FIG. 15) against the bias of spring 142. The trip push button 80 includes a longitudinal rod 144 having a conductive loop 146 on its distal end. When depressed, the conductive loop 146 electrically connects a pair of test pins 148 (FIG. 10), which causes an electronic test of the receptacle 70. Successful completion of the electronic test causes a trip of the receptacle 70 by energizing the solenoid 138. Failure of the electronic test does not trip the receptacle 70, but such failure can be indicated by removing the normal illuminated state of the indicator 96 (FIG. 6).

The trip mechanism 134 can include a processor (not shown) preferably structured to provide a number of different protection mechanisms selected from the group consisting of: overcurrent protection, reverse feed protection, and swapped line and neutral protection. See, for example, U.S. Pat. No. 7,518,840, which is expressly incorporated by reference herein. The trip mechanism 134 can also include the above-described self test mechanism as provided by the test button 80 and/or conventional ground fault protection provided through coils 150,152 (FIGS. 7 and 15) in the line and neutral conductors 104,105, and/or arc fault protection and/or overcurrent protection through a high frequency coil 154 (FIG. 15) in the line conductor 104.

When one of the electrical conductors, such as 104,106, 108 is welded to one of the contacts 112,114,116, respectively, the arms 156,158,160 of the spring members 124,125 of FIG. 11 function to bias downward (with respect to FIG. 11) the other two of the three contacts 112,114,116. For example, if the contact 112 is welded to the electrical conductor 105, then the contact 112 is held upward with respect to FIG. 11. This causes an upward (with respect to FIG. 11) force on the arm 156 and the other two arms 158,160 provide a downward force, which moves the other contacts 114,116 downward (with respect to FIG. 11).

Referring to FIGS. 12-14, another receptacle 162 is shown, which can be the same as or similar to the receptacle 70 of FIG. 6, except that different spring members 124' (only one spring member 124' is shown) are employed, each of which includes two spring arms 164,166. FIG. 12 shows an example of the respective fixed contacts 120,170,172 and movable contacts 112,114,116 in the intended open position, but with the load terminal contacts 116,172 welded. FIG. 13 shows an example of the respective fixed contacts 120,170,172 and movable contacts 112,114,116 in the intended open position, but with the other load contacts 114,170 welded. FIG. 14 shows an example of the normal open position, in which none of the contact pairs 112,120, 114,170 and 116,172 are welded. When one of the electrical conductors, such as 104, 106,108 is welded to one of the contacts 112,114,116, respectively, the operating mechanism 118' and the planar conductive member 110 cooperate to electrically disconnect the other two of the electrical conductors 104,106,108 from the other two of the contacts 112,114,116, respectively, upon the occurrence of the predetermined condition.

As is shown in FIGS. 12 and 13, the planar conductive member 110 is advantageously structured to tilt with respect to the rod 126 and the electrical conductors 104,106,108. For example, in FIG. 12, the contacts 112,114 are lower (with respect to FIG. 12) than contact 116, which is welded to the fixed contact 172; and, in FIG. 13, the contacts 112,116 are lower (with respect to FIG. 13) than contact 114, which is welded to the fixed contact 170. In FIGS. 12 and 13, the spring member 124' is biased between the carriage 122 and the planar conductive member 110. The two example arms 164, 166 of the spring member 124' bias the two non-welded contacts 112,114 (FIG. 12) or 112,116 (FIG. 13) away from the corresponding pairs of the fixed contacts 120,170,172 of the electrical conductors 104,106,108 upon the occurrence of the predetermined condition. For example, in FIG. 13, the spring arm 166 is flexed upward, which causes the other spring arm 164 to be biased downward (with respect to FIG. 13). It will be appreciated that the two example arms 164,166 of the spring member 124' similar bias the two non-welded contacts 114,116 (not shown) in the event that the contacts 112,120 are welded (not shown).

It will be appreciated that the other planar conductive member 111 (FIG. 11) operates in a similar manner as does the planar conductive member 110 shown in FIGS. 12-14. As shown in FIG. 11, longitudinal fasteners 174,175 fasten the spring members 124,125 on the example plastic shutter block 122 and pass through a portion 176 of the planar conductive members 110,111. Preferably, the longitudinal fasteners 174, 175 engage the planar conductive members 110,111 at a position 178 (shown in hidden line drawing) equidistant from each of the contacts 112,114,116.

Figure 17:
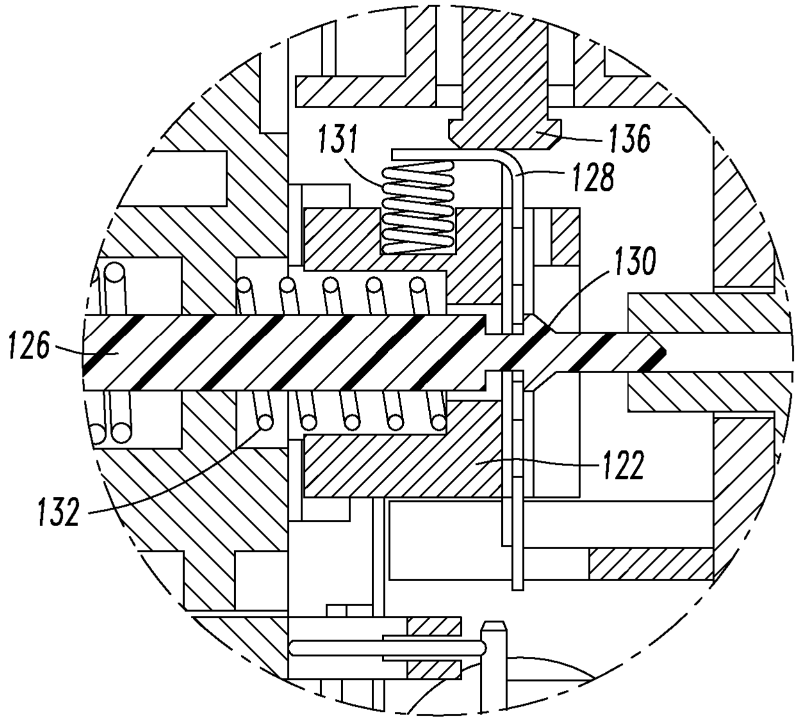
FIG. 17 is a more detailed view of a portion of FIG. 15 as shown in an armed, non-tripped position.

As shown in FIGS. 12-14, the example operating mechanism 118' includes the carriage member 122 and the rod 126 of the reset button 78 (FIG. 6), which is coupled to the carriage member 122 as was discussed, above, in connection with FIG. 17. The planar conductive member 110 is pivotally coupled to the carriage member 122 at a pivot 180.

Figure 18:
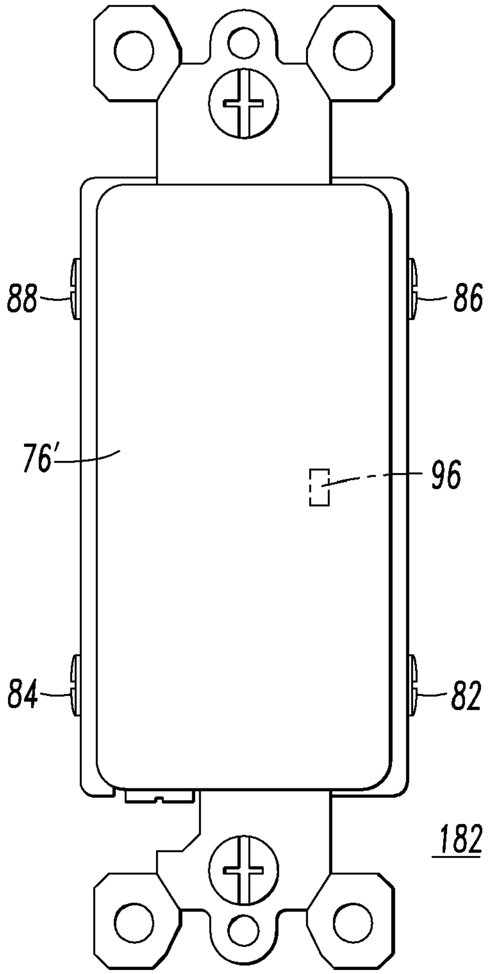
FIGS. 18 and 19 are plan views of receptacles in accordance with other embodiments of the disclosed concept.
Figure 19:
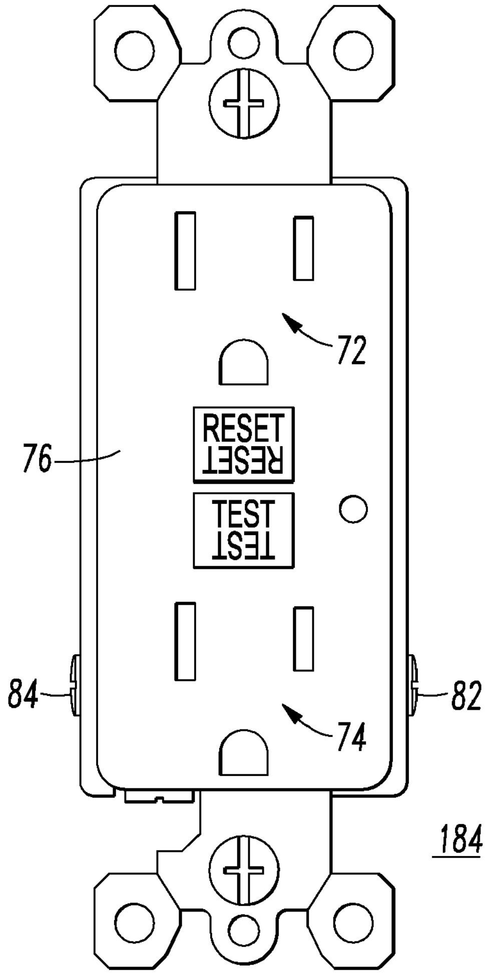

Referring to FIGS. 18 and 19, two receptacles 182,184 are shown. The receptacle 182 of FIG. 18 is a "faceless" receptacle, which is similar to the receptacle 70 of FIG. 6 except that the female outlets (e.g., ports) 72,74 are not provided. Instead of the face 76 of FIG. 6, a blank receptacle face 76' can be provided, which can optionally include the indicator 96 of FIG. 6 (shown in phantom line drawing in FIG. 18). As a result, the contacts 116 of FIG. 7 and the electrical conductors 108,109 of FIG. 8 need not be employed. The electrical conductors 106,107 and the corresponding terminals 86,88 of FIG. 9 are structured to be electrically connected to a downstream load (e.g., without limitation, a downstream receptacle) (not shown).

The receptacle 184 of FIG. 19 can be similar to the receptacle 70 of FIG. 6 except that the contacts 114 of FIG. 7 and the electrical conductors 106,107 of FIG. 9 need not be employed. The electrical conductors 108,109 (FIG. 8) are employed for the female outlets (e.g., ports) 72,74 (user load (s)) of FIG. 6. See, for example, the base portion 102' of FIG. 10, which does not include the load line terminal 86 and the load neutral terminal 88.

Figure 20:
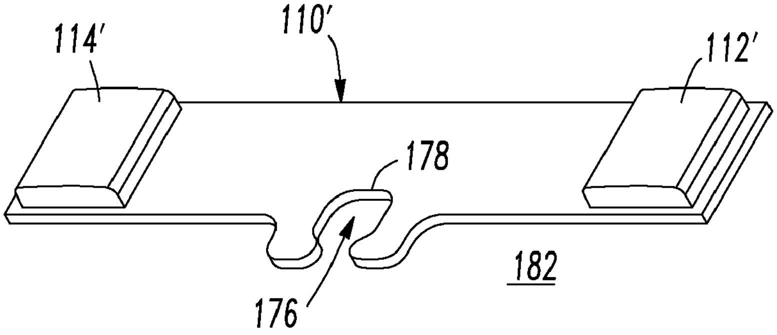
FIG. 20 is an isometric view of a linear conductive member including two contacts, which are co-linear, for the receptacle of FIG. 18.

The receptacle 182 of FIG. 18 includes a linear conductive member 110' (FIG. 20) having two contacts 112',114', which are co-linear. Otherwise, the linear conductive member 110' can function in a similar manner as the planar conductive member 110 of FIG. 11 except that the contact 116 need not be employed. The receptacle 184 of FIG. 19 can include the same or similar linear conductive member 110', except that, for example and without limitation, the electrical conductors 108,109 of FIG. 8 could be relocated downward (with respect to FIG. 8) to be electrically connected to and disconnected from the movable contact 114'.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A circuit interrupter comprising:

a first electrical conductor;

a second electrical conductor;

a third electrical conductor;

a planar conductive member comprising:

a first contact, a second contact, and a third contact; and an operating mechanism structured to move said planar conductive member toward said electrical conductors to electrically connect said first electrical conductor, said second electrical conductor and said third electrical conductor to said first contact, said second contact and said third contact, respectively, and to move said planar conductive member away from said electrical conductors to electrically disconnect said first electrical conductor, said second electrical conductor and said third electrical conductor from said first contact, said second contact and said third contact, respectively, upon the occurrence of a predetermined condition, such that said electrical conductors are electrically isolated from each other, wherein when one of said first electrical conductor, said second electrical conductor and said third electrical conductor is welded to one of said first contact, said second contact and said third contact, respectively, said operating mechanism and said planar conductive member cooperate to electrically disconnect the other two of said first electrical conductor, said second electrical conductor and said third electrical conductor from the other two of said first contact, said second contact and said third contact, respectively, upon the occurrence of the predetermined condition, wherein said operating mechanism comprises a carriage member;

wherein said planar conductive member is pivotally coupled to said carriage member, in order that when said one of said first contact, said second contact and said third contact is welded to said one of said first electrical conductor, said second electrical conductor and said third electrical conductor, respectively, said planar conductive member is structured to tilt to electrically disconnect the other two of said first electrical conductor, said second electrical conductor and said third electrical conductor from the other two of said first contact, said second contact and said third contact, respectively, upon the occurrence of the predetermined condition, and wherein said carriage member includes a spring member having three arms, two of said three arms being structured to bias said other two of said first contact, said second contact and said third contact away from said other two of said first electrical conductor, said second electrical conductor and said third electrical conductor, respectively, upon the occurrence of the predetermined condition.

2. The circuit interrupter of claim 1 wherein said operating mechanism comprises a longitudinal member; and wherein said planar conductive member is normally disposed normal to said longitudinal member.

3. The circuit interrupter of claim 2 wherein said longitudinal member engages said planar conductive member at a position equidistant from each of said contacts.

4. The circuit interrupter of claim 2 wherein said planar conductive member is structured to tilt with respect to said longitudinal member and said electrical conductors.

5. The circuit interrupter of claim 1 wherein said operating mechanism comprises a trip mechanism.

6. The circuit interrupter of claim 5 wherein said trip mechanism is structured to provide overcurrent protection.

7. The circuit interrupter of claim 1 wherein said operating mechanism comprises a longitudinal member; and wherein said planar conductive member is electrically isolated from said longitudinal member.

8. The circuit interrupter of claim 1 wherein said operating mechanism comprises a latching mechanism, an unlatching mechanism, a reset member structured to reset said latching mechanism, and a trip member structured to activate said unlatching mechanism.

9. A circuit interrupter comprising:

a first electrical conductor comprising a first contact;

a second electrical conductor comprising a second contact;

a third electrical conductor comprising a third contact;

a conductive member comprising:

a fourth contact, a fifth contact, and a sixth contact; and an operating mechanism structured to move said conductive member toward said electrical conductors to electrically connect said first contact, said second contact and said third contact to said fourth contact, said fifth contact and said sixth contact, respectively, and to move said conductive member away from said electrical conductors to electrically disconnect said first contact, said second contact and said third contact from said fourth contact, said fifth contact and said sixth contact, respectively, upon the occurrence of a predetermined condition, such that said electrical conductors are electrically isolated from each other, wherein said fourth contact, said fifth contact and said sixth contact are biased toward said first contact, said second contact and said third contact, respectively, or said first contact, said second contact and said third contact are biased toward said fourth contact, said fifth contact and said sixth contact, respectively, and wherein said first contact, said second contact and said third contact are co-linear.

10. A circuit interrupter comprising:

for each of a line input and a neutral input:

a first electrical conductor;

a second electrical conductor;

a third electrical conductor;

a planar conductive member comprising:

a first contact, a second contact, and a third contact; and an operating mechanism structured to move said planar conductive member toward said electrical conductors to electrically connect said first electrical conductor, said second electrical conductor and said third electrical conductor to said first contact, said second contact and said third contact, respectively, and to move said planar conductive member away from said electrical conductors to electrically disconnect said first electrical conductor, said second electrical conductor and said third electrical conductor from said first contact, said second contact and said third contact, respectively, upon the occurrence of a predetermined condition, such that said electrical conductors are electrically isolated from each other, wherein when one of said first electrical conductor, said second electrical conductor and said third electrical conductor is welded to one of said first contact, said second contact and said third contact, respectively, said operating mechanism and said planar conductive member cooperate to electrically disconnect the other two of said first electrical conductor, said second electrical conductor and said third electrical conductor from the other two of said first contact, said second contact and said third contact, respectively, upon the occurrence of the predetermined condition, wherein said operating mechanism comprises a carriage member;

wherein said planar conductive member is pivotally coupled to said carriage member, in order that when said one of said first contact, said second contact and said third contact is welded to said one of said first electrical conductor, said second electrical conductor and said third electrical conductor, respectively, said planar conductive member is structured to tilt to electrically disconnect the other two of said first electrical conductor, said second electrical conductor and said third electrical conductor from the other two of said first contact, said second contact and said third contact, respectively, upon the occurrence of the predetermined condition, and wherein said carriage member includes a spring member having three arms, two of said three arms being structured to bias said other two of said first contact, said second contact and said third contact away from said other two of said first electrical conductor, said second electrical conductor and said third electrical conductor, respectively, upon the occurrence of the predetermined condition.

11. The circuit interrupter of claim 10 wherein said operating mechanism comprises a trip mechanism including a number of protection mechanisms selected from the group consisting of: overcurrent protection, reverse feed protection, and swapped line and neutral protection.

12. The circuit interrupter of claim 10 wherein said operating mechanism comprises a longitudinal member; and wherein said planar conductive member is electrically isolated from said longitudinal member.

13. The circuit interrupter of claim 12 wherein said planar conductive member is structured to tilt with respect to said longitudinal member and said electrical conductors.

14. The circuit interrupter of claim 10 wherein said longitudinal member engages said planar conductive member at a position equidistant from each of said contacts.

15. The circuit interrupter of claim 10 wherein said operating mechanism comprises a trip mechanism including a self test mechanism.

16. A circuit interrupter comprising:

a first electrical conductor comprising a first contact;

a second electrical conductor comprising a second contact;

a third electrical conductor comprising a third contact;

a conductive member comprising:

a fourth contact, a fifth contact, and a sixth contact; and an operating mechanism structured to move said conductive member toward said electrical conductors to electrically connect said first contact, said second contact and said third contact to said fourth contact, said fifth contact and said sixth contact, respectively, and to move said conductive member away from said electrical conductors to electrically disconnect said first contact, said second contact and said third contact from said fourth contact, said fifth contact and said sixth contact, respectively, upon the occurrence of a predetermined condition, such that said electrical conductors are electrically isolated from each other, wherein said fourth contact, said fifth contact and said sixth contact are biased toward said first contact, said second contact and said third contact, respectively, by three electrically conductive spring members, or said first contact, said second contact and said third contact are biased toward said fourth contact, said fifth contact and said sixth contact, respectively, by three electrically conductive spring members, and wherein said first contact, said second contact and said third contact are at least one of co-linear or co-planar.

* * * * *